UNITED STATES PATENT OFFICE.

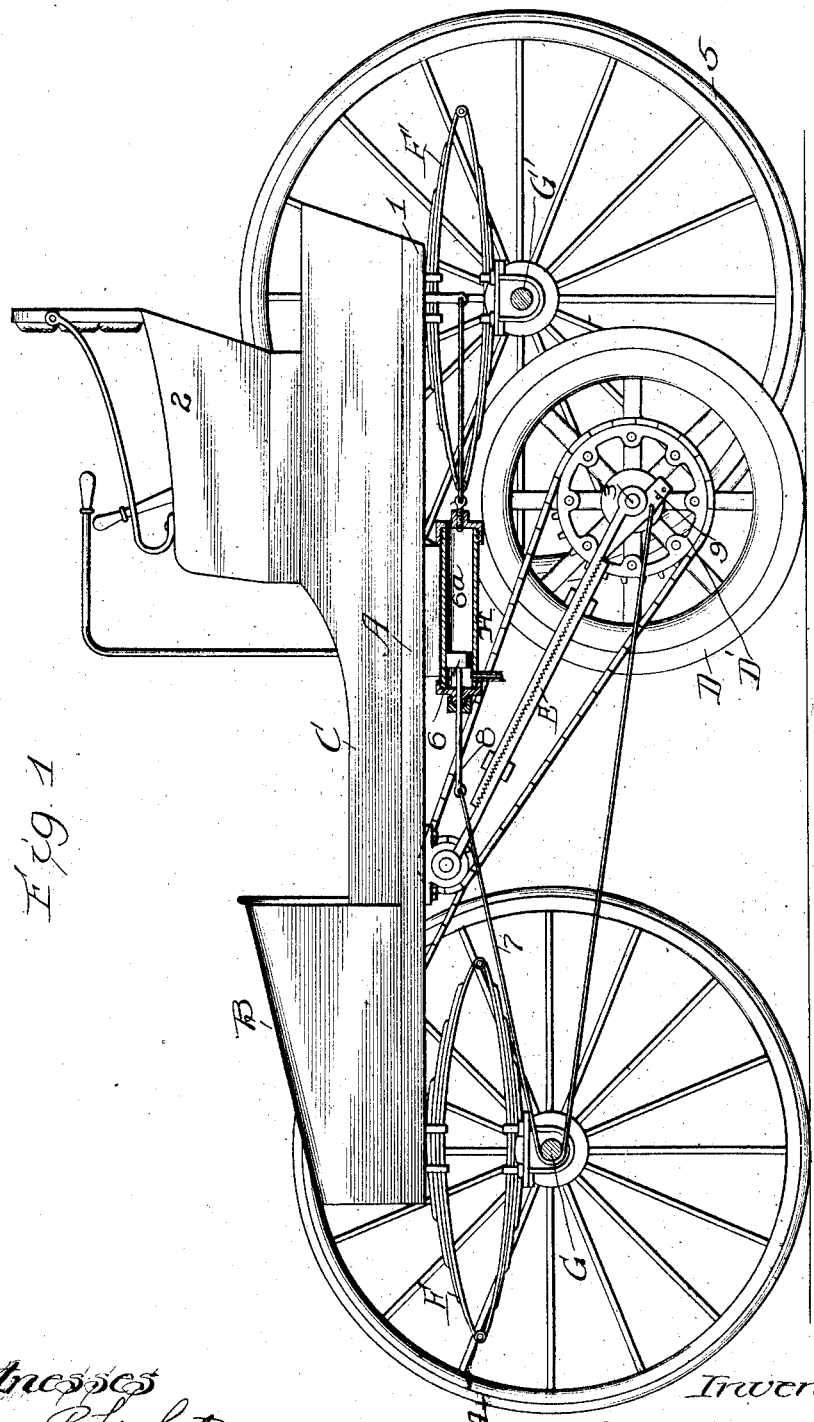

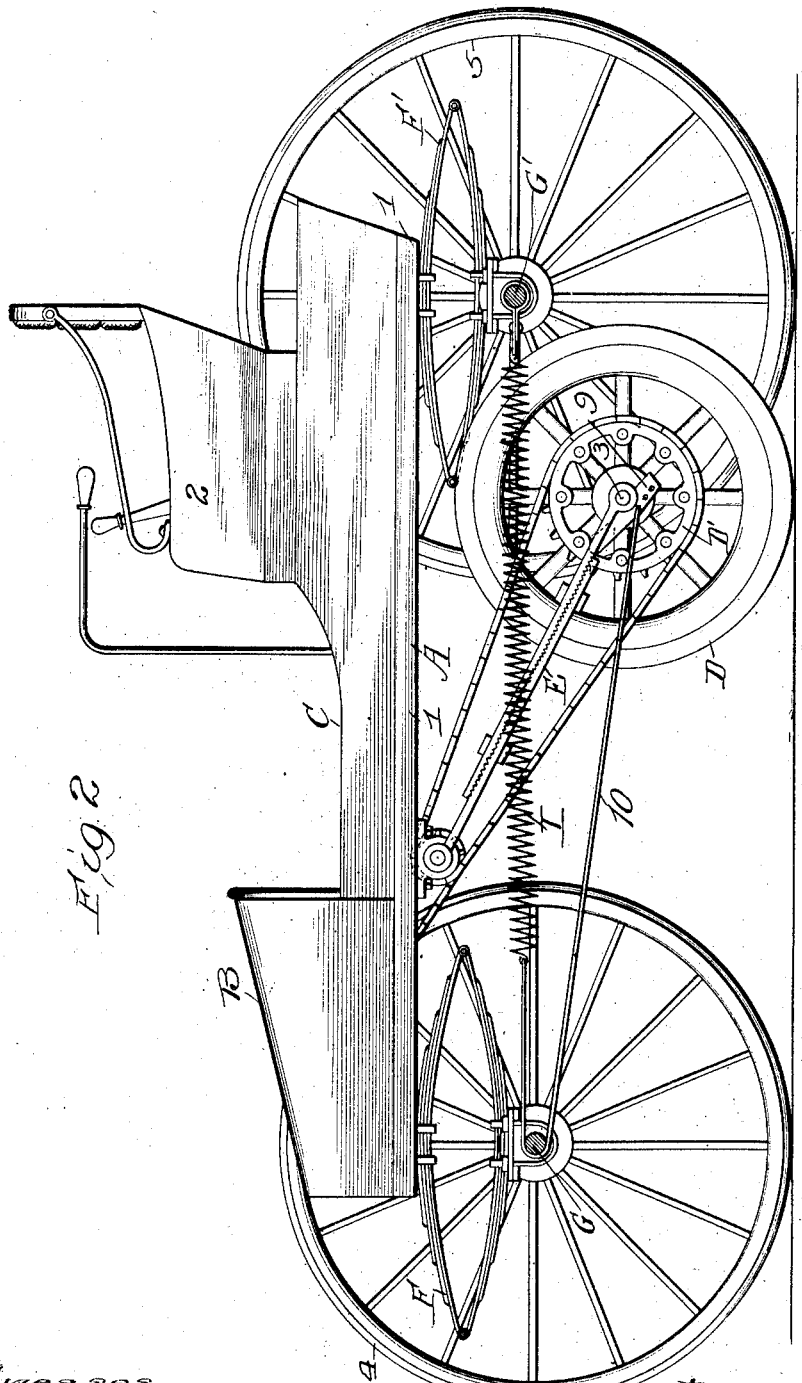

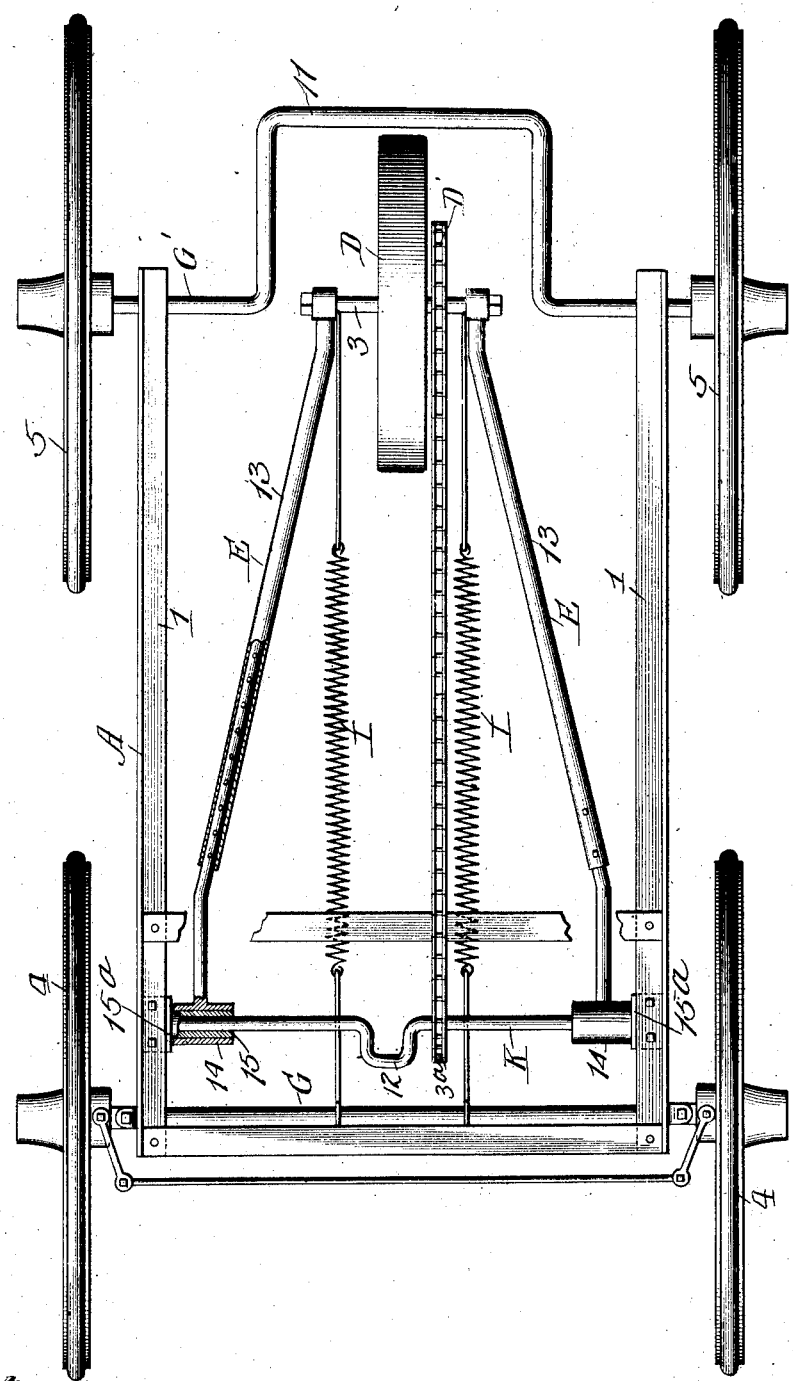

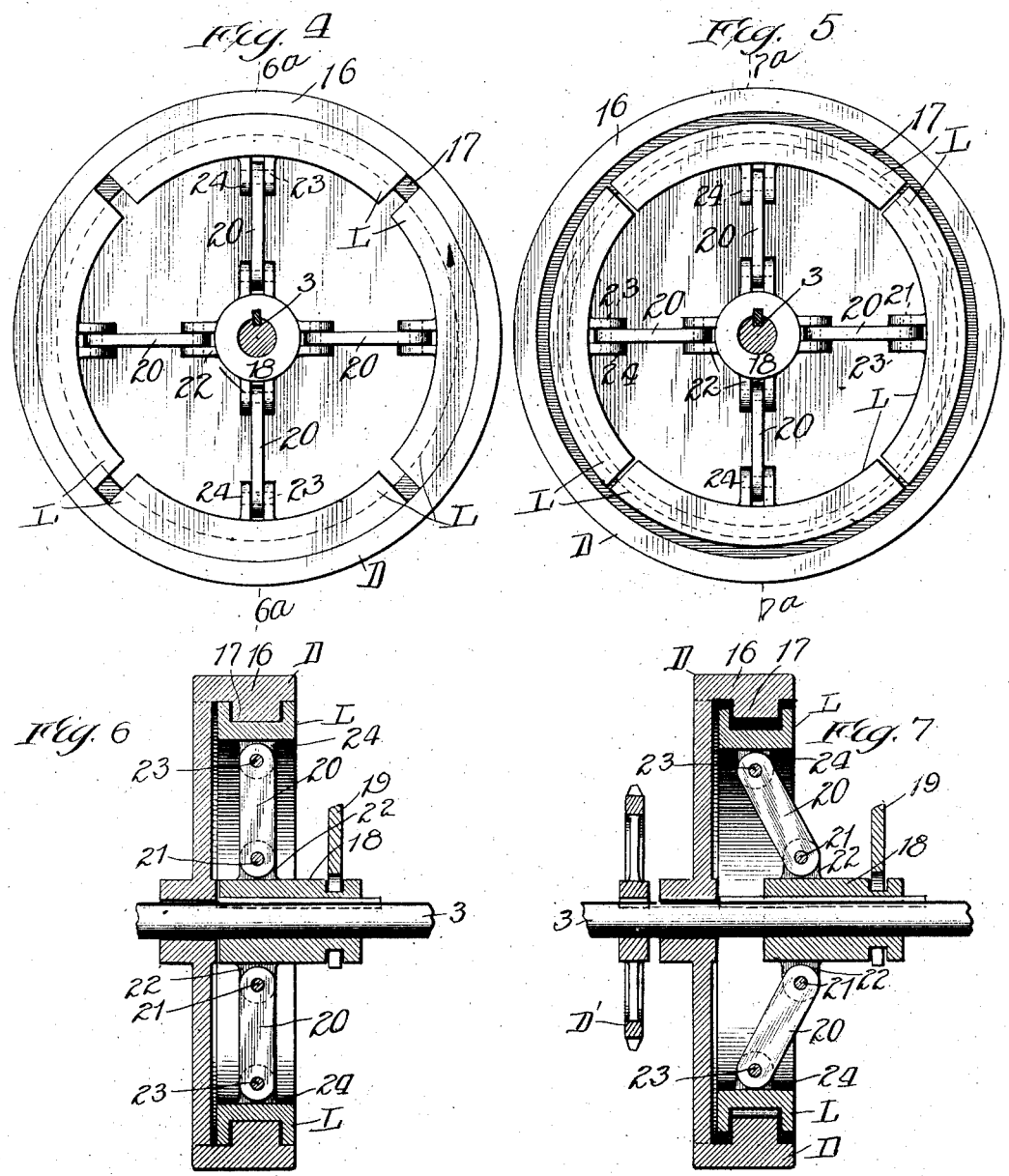

GEORGE T. GLOVER, OF CHICAGO, ILLINOIS.

MOTOR-VEHICLE.

No. 926,938.　　　Specification of Letters Patent.　　Patented July 6, 1909.

Application filed May 7, 1907. Serial No. 372,323.

*To all whom it may concern:*

Be it known that I, GEORGE T. GLOVER, a citizen of the United States, residing at Chicago, in the county of Cook and State of Illinois, have invented certain new and useful Improvements in Motor-Vehicles, of which the following is a specification.

My invention consists in certain improvements upon the motor vehicle described in my Patent No. 840,930 of January 8, 1907, as hereinafter more particularly set forth.

In the accompanying drawings: Figure 1 illustrates partly in side elevation and partly in longitudinal central section on a vertical plane, a motor vehicle embodying certain features of my improvements, the spring resistance being provided by a body of compressed air. Fig. 2 is a like view, illustrating however, a coil in place of a cylinder for compressed air. Fig. 3 is a top plan view of the body frame with the body removed, a portion of the machine being in horizontal section. Figs. 4 and 5 are end views of the traction wheel provided with a clutch and speed changing device, the axle for the traction wheel being in cross section. Fig. 6 is a section on line 6ª—6ª in Fig. 4. Fig. 7 is a section through Fig. 5 on line 7ª—7ª.

The body frame A is shown as constructed with two longitudinally extending side bars 1, 1, each of which is preferably an angle bar. These angle bars are connected by transverse connections so as to form a seat frame for a motor or engine conventionally indicated at B, and for a box C upon which a seat 2 can be arranged, said seat frame A being similar to the seat frame illustrated in my said patent.

D illustrates the traction propelling wheel mounted upon a short axle 3 and connected with the body frame A by a swinging frame or member E, which connects at its rear end with the axle of the traction propelling wheel, and which extends from its connection with said wheel forwardly and upwardly to a point where it is connected with the body or seat frame A.

The body or seat frame A is supported upon suitable springs, for example, it is shown supported upon forward springs F and upon rear springs F', and these said springs are in turn respectively supported upon the front and rear axles G and G' of the forward running wheels 4 and the rear running wheels 5.

The propelling frame or member E is pivotally or hinge-connected with the spring supported body frame, which latter is in effect spring supported upon the running wheels. By this arrangement depression of the spring supported body frame flexes the springs and lowers the hinge connection between the propelling member E and the body frame, the effect of such action being to lower the upper hinged end of the propelling member and thereby bring the traction propelling wheel nearer the rear end of the vehicle, the converse of such action being incident to any up movement or rise on the part of the body frame.

In the several forms illustrated, the traction propelling wheel, and consequently the propelling frame or member E, is subject to a tension or traction spring normally under tension and tending to draw the axis of the traction propelling wheel toward a point under the axis about which the upper end portion of the propelling member E is arranged to swing.

In Fig. 1, H is a conventional illustration of an air cushion device which is understood to be supplied with compressed air by means of any suitable engine or motor which is carried by the machine and which is also preferably used for operating the traction propelling wheel. As illustrated, a piston 6 is arranged within a cylinder 6ª and is understood to be normally forced back by compressed air which latter forms an elastic cushion within the cylinder forward of the piston. With this arrangement suitable connection is provided between the piston and the traction propelling wheel, as for example—a flexible cable 7 connects with the forward end of the piston stem 8 and from thence passes forward to and about the axle G or any suitable anti-friction sleeve, pulley or like device on the axle, and from thence said cable passes back to and connects with a lower rear portion 9 of the propelling frame or member E, and this tension device can be duplicated whereby I may provide one at each side of the traction propelling wheel. The air cushion cylinder for the body of compressed air can by this arrangement be placed close to the body frame to which it is attached and by the arrangement of cable 7, the tendency of the body of compressed air to force the piston back will also tend to draw the axis of the traction propelling wheel forward. The pressure within the cylinder can obviously be governed automatically or at will, and it is also evident that any suitable means can be employed for varying such pressure.

In Fig. 2 a comparatively long tension spring I tends to retract in direction toward the rear of the vehicle, and tends to draw the axis through the medium of a cord or cable 10. The spring I shown in Fig. 2, is attached at one end to the rear axle, and to its forward end is attached one end of the cord or cable 10, the other end of said cord or cable being attached to the lower portion of the propelling arm or member E, a portion of the cord or cable between its said ends being carried about the front axle which can be provided with any suitable loose sleeve or pulley forming a bearing for said cord or cable. With this arrangement the spring I and cord 10 is arranged at one side of the traction propelling wheel and it is understood that a like spring and cable can be arranged at the opposite side of said wheel. While I have shown the rear end of spring I attached to the rear axle, its point of connection can be shifted from the axle to the rear portion of the body-frame, and in such case, the cord 10 may pass about the front axle as illustrated, or it may pass about a sheave on the forward portion of the body frame and thence down to the rear portion of the propelling frame E. Thus arranged the spring will be practically out of sight, or at least less conspicuous.

In Fig. 3 I have shown the rear axle provided with a rearwardly projecting double crank portion 11, and by this arrangement the traction propelling wheel can be set back so that its axis can be brought in alinement or substantially so with the stub portions G' of such axle. The object of this portion of my invention is to prevent sluing of the traction wheel or running wheels when the motor vehicle is turning. In my said patent I have shown a counter-shaft supported upon the body frame and provided with two sprockets, one for an endless link belt connecting one of said sprockets on an engine or motor shaft, the other sprocket on the counter-shaft being connected by an endless link chain or belt with a sprocket on the axle of the traction propelling wheel. But in Fig. 3 of my present application I connect the sprocket D' on the axle 3 of the traction propelling wheel, directly with a sprocket 3ª on the engine or motor shaft K, which is shown provided with a middle cranked portion 12 by any suitable power transmitting connection, therein shown as an endless chain. With this arrangement the two arms or sections 13 of the propelling frame or member E have their forward ends secured to or provided with sleeves 14, which fit upon bearings or bushings 15 on the engine shaft, one of said bushings or bearings being shown in section in said Fig. 3. These bearings 15 are rigid with boxes 15ª which are in turn rigidly secured to the body frame of the vehicle, and by this arrangement, I diminish friction and insure strength, it being observed that the sleeves 14 will turn in the bearings 15 when the frame E is tilted.

Referring now to Figs. 4, 5, 6 and 7, D indicates the traction propelling wheel which is drawn on a scale somewhat larger than in preceding figures. This wheel is mounted upon the axle 3 and made hollow or recessed at one side as clearly shown in Figs. 6 and 7, thereby providing it with a tread portion 16 which overhangs the recess and which is also formed or provided with an inner annular rib 17. Within this recess I arrange a friction clutch device comprising or constructed with a hub 18 which is mounted and splined to slide upon the axle 3 and engaged by a clutch lever 19. The clutch hub 18 is provided with a series of radial arms 20 which are at their inner ends hinged upon the hub 18 by means of pivots 21 arranged transverse to the axis of the hub and fitted to lugs 22 thereon. The outer ends of these arms 20 are attached by similar pins 23 to lugs 24 on segments L, which are formed with channeled peripheral portions adapted to receive the rib 17 on wheel D when the clutch is retracted within the wheel as in Fig. 6. When however, the clutch hub is moved outwardly from the wheel as in Fig. 7, its arms 20 will be drawn into an inclined position thereby contracting the annulus formed by the sections L, and hence relieving the clutch from frictional driving contact with the propelling wheel. The clutch hub 18 can be shifted along axle 3 by the clutch lever, and is revolved by rotating the axle 3, said axle being revolved from the engine by any suitable power transmitting gearing, or by a sprocket chain engaging a sprocket fixed on axle 3 as in preceding figures. It is also understood that broadly considered the sprocket wheel and chain constitute power transmitting gearing. The wheel D is loose on the axle and can be clutched thereon by the clutch which latter can also be adjusted so as to vary frictional contact between the clutch members L and the wheel D for varying speed.

With reference to the several features of improvement hereinbefore described, it is understood that any or all of these said improvements broadly considered can be practically embodied in one machine. For example, a clutch device such as illustrated in the last four figures can obviously be applied to a motor vehicle such as illustrated in any of the preceding figures. Thus if applied to the machine illustrated by Fig. 3, the sprocket can be applied to the axle 3 at one side of the wheel D, and said wheel can be constructed as in the last four figures. Of course where an elastic air cushion is employed as a tension spring in connection with Fig. 1, it will not be necessary to employ the form of tension spring shown in Fig. 2, but Fig. 1 broadly illustrates a tension spring device directly under and carried by the body, and as hereinbefore observed; the tension spring I of Fig. 2 can be likewise arranged, and therefore, both Figs. 1 and 2 illustrate spring tension means carried by and arranged close to the underside of the vehicle body so as to be out of the way, and so as to occupy a position which is not conspicuous. The double crank rear axle can also be applied to any one of the machines illustrated, and the machine, broadly considered, can be provided with such double crank axle and with a traction propelling wheel D arranged as in Fig. 3, so that when the propelling arm or member is raised, the traction propelling wheel will not strike the rear axle. In Figs. 1 and 2, the propelling member E is hung substantially as in my said patent, but in place of this arrangement it can obviously be hung as in Fig. 3.

What I claim as my invention is:

1. In a motor vehicle, a body frame spring supported upon forward and rear running wheels; a traction propelling wheel between the planes of the rear running wheels; a trailing propelling member or thrust arm having its upper forward end portion pivotally connected with the vehicle and having its lower rear end portion connected with the traction propelling wheel; tension spring means supported upon the body portion and flexible power transmitting connection arranged to extend from the tension spring means forwardly to a bearing point on the vehicle and thence rearwardly to the lower portion of the trailing propelling member and tending to normally swing the same forward toward a point under the axis about which it is pivoted, said spring means being otherwise separate and disconnected from the trailing propelling member.

2. In a motor vehicle, a body frame supported upon running wheels; a motor or engine; a traction propelling wheel; a vibratory propelling arm or frame hinge-connected with the body frame and also connected with the traction propelling wheel; and a spring tension device for keeping down the traction propelling wheel and comprising means for storing compressed air and suitable connection between such tension spring device and the traction propelling wheel.

3. In a motor vehicle, a body frame supported upon running wheels; a trailing arm or frame having its forward upper end pivotally connected with the body frame and having its rear lower end portion connected with the traction propelling wheel; an elastic tension device comprising a cylinder for compressed air and a piston therein, the piston being connected with the traction propelling wheel by flexible connection; and means for supplying the piston cylinder with compressed air.

4. In a motor vehicle, a wheel supported body frame; the engine or motor shaft supported upon the body frame; bearings for the rotary engine shaft also supported upon the body frame; a traction propelling wheel arranged to travel along the line between the planes of opposite running wheels; a vibratory arm or frame connected with the traction propelling wheel and having their upper ends provided with sleeves fitted to turn upon the bearings through which the rotary engine shaft extends; power transmitting connection between the rotary engine shaft and the traction propelling wheel, and traction spring means acting upon the said traction propelling wheel.

5. In a motor vehicle, a body frame spring supported upon running wheels; a trailing arm or frame having its forward upper end portion pivotally connected with the body frame and having its lower end portion connected with the traction propelling wheel; spring means normally urging the trailing arm or frame to swing downwardly and forwardly, and means for actuating the traction propelling wheel, the rear axle portion between the two rear wheels being laterally deflected to provide space for the traction propelling wheel and the latter being arranged with its axis coincident or substantially coincident with the outer end portions of the said rear axle.

6. In a motor vehicle, a body frame supported upon running wheels; a traction propelling wheel arranged between the two rear running wheels; means for operating the traction propelling wheel; a propelling arm or frame normally inclined and having its upper end portion pivotally connected with the body frame and its lower end portion connected with the traction propelling wheel; and spring tension means operating on the traction propelling wheel, the rear axle having a cranked middle portion forming space for a portion of the traction propelling wheel.

7. In a motor vehicle, a body frame spring supported upon forward and rear running wheels; a normally inclined arm or frame having its high end portion pivotally connected with the body frame and having its low end portion connected with the traction propelling wheel; traction spring means acting upon the vibratory arm or frame, and means for operating the traction propelling wheel, the rear wheels being upon relatively short axle portions, and the traction propelling wheel being arranged with its axis coincident or substantially coincident with the axis of said axle portions to prevent sluing.

8. In a motor vehicle, a wheel supported body frame; a vibratory inclined arm or frame having one end portion pivotally attached to the body frame; a traction propelling wheel connected with the opposite end portion of said vibratory arm or frame; spring tension means for acting upon the traction propelling wheel; a friction clutch device for engaging and releasing the traction propelling wheel and means for operating the friction clutch device at will.

9. In a motor vehicle, a body frame spring supported upon running wheel; a trailing arm or frame pivotally connected with the body frame and provided at its lower end portion with a rotary axle, said traction propelling wheel being recessed; a friction clutch device comprising a hub which is splined upon said rotary axle so as to slide along and revolve therewith, a bearing portion on the inner side of the recessed traction propelling wheel; recessed segments for engaging and releasing said bearing portion, and pivoted links or arms connecting said segmental portions with the splined hub; an engine or motor and power transmitting connection between the engine or motor and the rotary axle which is carried by the trailing arm or frame and upon which the traction wheel is loosely mounted.

10. In a motor vehicle, a body which is spring supported upon front and rear wheels and provided with an engine or motor; a traction propelling wheel upon the rear end portion of swinging arm or frame, which latter constitutes a push or propelling frame or arm pivotally connected with the body; power transmitting connection between the motor on the body and the traction propelling wheel on the lower rear portion of the swinging propelling arm or frame; and tension means operating to swing the propelling arm or frame in direction to urge the axis of the traction propelling wheel toward a point under the pivotal connection between the propelling arm or frame and the vehicle frame, said tension means consisting of a device for compressing air from the motor on the vehicle and suitable power transmitting connection between the air compressor and the propelling arm or frame.

11. In a motor vehicle, a propelling wheel and arm or frame pivotally connecting the traction wheel with the body frame of the vehicle; air compressing means for storing power and utilizing such energy as a means for depressing the axis of the traction wheel; and a motor vehicle for operating the traction wheel and also for operating the air compressing device.

GEORGE T. GLOVER.

Witnesses:
CHARLES G. PAGE,
OTTILIE C. FREIBERG.